United States Patent
Chung et al.

(10) Patent No.: US 12,469,148 B2
(45) Date of Patent: Nov. 11, 2025

(54) IMAGE SEGMENTATION MODEL TRAINING METHOD AND ELECTRONIC DEVICE

(71) Applicant: Acer Incorporated, New Taipei (TW)

(72) Inventors: Shang-Lin Chung, New Taipei (TW); Chien-Hung Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 299 days.

(21) Appl. No.: 18/347,579

(22) Filed: Jul. 6, 2023

(65) Prior Publication Data

US 2024/0378728 A1    Nov. 14, 2024

(30) Foreign Application Priority Data

May 11, 2023    (TW) .................................. 112117601

(51) Int. Cl.
*G06T 7/194*        (2017.01)

(52) U.S. Cl.
CPC .... *G06T 7/194* (2017.01); *G06T 2207/20081* (2013.01)

(58) Field of Classification Search
CPC . G06T 7/194; G06T 7/11; G06T 2207/20081; G06T 2207/30096; G06T 2207/20084
See application file for complete search history.

(56) References Cited

U.S. PATENT DOCUMENTS

| | | | |
|---|---|---|---|
| 2019/0340765 A1* | 11/2019 | Scott | G06T 7/194 |
| 2020/0167930 A1* | 5/2020 | Wang | G06N 3/08 |
| 2020/0320709 A1* | 10/2020 | Geipel | G06F 18/214 |
| 2022/0058809 A1* | 2/2022 | Fuchs | G06V 10/751 |
| 2023/0031919 A1* | 2/2023 | Kim | G06T 7/11 |
| 2023/0040908 A1* | 2/2023 | Kiyasseh | G06N 3/08 |

FOREIGN PATENT DOCUMENTS

TW    202127295    7/2021

* cited by examiner

*Primary Examiner* — Syed Haider
(74) *Attorney, Agent, or Firm* — JCIPRNET

(57) ABSTRACT

The disclosure provides an image segmentation model training method and an electronic device. The method includes the following steps. A plurality of labeled images of a training image are obtained, wherein each of the labeled images includes a labeled target area and a background area. A union area of the labeled target areas of the plurality of labeled images is obtained, and a complement area of the union area is obtained. A predicted segmented image of the training image is generated using an image segmentation model. A first loss value is generated according to the predicted segmented image and the complement area. A second loss value is generated according to the predicted segmented image and the labeled target area of at least one of the plurality of labeled images. The image segmentation model is trained according to the first loss value and the second loss value.

20 Claims, 6 Drawing Sheets

IMAGE SEGMENTATION MODEL TRAINING METHOD AND ELECTRONIC DEVICE

CROSS-REFERENCE TO RELATED APPLICATION

This application claims the priority benefit of Taiwan application serial no. 112117601, filed on May 11, 2023. The entirety of the above-mentioned patent application is hereby incorporated by reference herein and made a part of this specification.

BACKGROUND OF THE INVENTION

Field of the Invention

The invention relates to a training method of a deep learning model, and in particular to an image segmentation model training method and an electronic device.

Description of Related Art

Image segmentation is a commonly used image processing technique, and may be used to independently cut out a specific object in an image for further analysis and processing. For example, in medical imaging applications, image segmentation may be used to find a key target area in a medical image, such as organ, tissue, or tumor. With the advancement of technology, deep learning models have been widely used in image segmentation tasks. In a situation where a deep learning model is used to achieve image segmentation, a large amount of image data is needed to train the deep learning model.

In the process of training the deep learning model, a loss function is used to evaluate the prediction accuracy of the deep learning model, so as to further optimize the model parameters of the deep learning model. Specifically, a loss function is a function that measures the difference between the prediction results of a deep learning model and actual data. For training deep learning models for image segmentation, the most common loss function is the Dice loss function. The Dice loss function is defined according to the Dice coefficient. The Dice coefficient is an index commonly used to measure the similarity between the prediction results of the image segmentation model and the real segmentation results.

However, in the field of medical image segmentation, there are situations where a doctor needs to label the target area in the medical image according to medical knowledge and experience. However, the opinions of different doctors may be different, resulting in inconsistent labeling results, which may be called the uncertainty of image segmentation (segmentation uncertainty). For example, in some public image datasets, a medical image used for model training may be labeled by a plurality of physicians, resulting in a plurality of labeling results. That is, the labeled areas labeled by different doctors are not consistent. When there are a plurality of labeling results for a training image, the plurality of labeled results are generally integrated into one labeled image, and then model training is performed according to the labeled image.

Currently commonly used label integration methods include generating a union, an intersection, or a weighted average of a plurality of labeling results to perform model training according to the difference between the union, intersection, or weighted average of the labeling results and the model prediction results. The weighted average of the labeling results is to multiply each labeled area by one weight and add them up to generate a labeled image having a sense of gradient. However, regardless of which of the union, intersection, or weighted average of the labeling results is used, the model training results may not be as expected. For example, the intersection of the labeling results is necessarily less than the labeling results identified by all labelers. The area boundary of the intersection of the labeling results is also not necessarily reasonable. The union of the labeling results is necessarily greater than the labeling results identified by all the labelers, and the union of the labeling results has a larger labeling error. In addition, although the weighted average of the labeling results may weaken the influence of the uncertainty boundary on the model, the above defects remain.

SUMMARY OF THE INVENTION

Accordingly, the invention provides an image segmentation model training method and an electronic device that may solve the above technical issues.

The invention provides an image segmentation model training method suitable for an electronic device and including the following steps. A plurality of labeled images of a training image are obtained, wherein each of the labeled images includes a labeled target area and a background area. A union area of the labeled target areas of the plurality of labeled images is obtained, and a complement area of the union area is obtained. A predicted segmented image of the training image is generated using an image segmentation model. A first loss value is generated according to the predicted segmented image and the complement area. A second loss value is generated according to the predicted segmented image and the labeled target area of at least one of the plurality of labeled images. The image segmentation model is trained according to the first loss value and the second loss value.

The invention provides an electronic device including a storage device and a processor. The storage device stores a program code. The processor is coupled to the storage device and accesses the program code to execute the following operation. A plurality of labeled images of a training image are obtained, wherein each of the labeled images includes a labeled target area and a background area. A union area of the labeled target areas of the plurality of labeled images is obtained, and a complement area of the union area is obtained. A predicted segmented image of the training image is generated using an image segmentation model. A first loss value is generated according to the predicted segmented image and the complement area. A second loss value is generated according to the predicted segmented image and the labeled target area of at least one of the plurality of labeled images. The image segmentation model is trained according to the first loss value and the second loss value.

Based on the above, in an embodiment of the invention, the complement area may be generated according to the union area of the labeled target areas of the plurality of labeled images, and the complement area may be used to generate the first loss value. In addition, the second loss value may be generated according to the labeled target area of at least one of the plurality of labeled images. Therefore, by using the first loss value and the second loss value to train the image segmentation model, the segmentation accuracy of the image segmentation model may be improved.

In order to make the aforementioned features and advantages of the disclosure more comprehensible, embodiments accompanied with figures are described in detail below.

DESCRIPTION OF THE EMBODIMENTS

Figure 1:
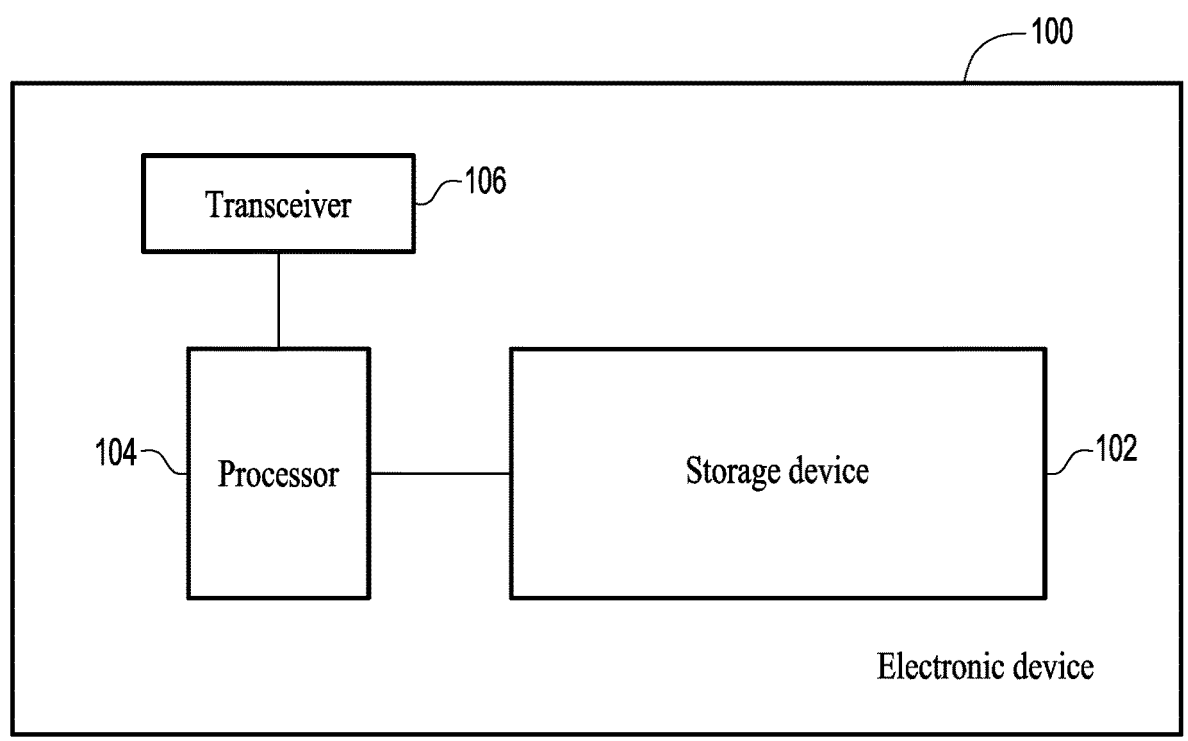
FIG. 1 is a schematic diagram of an electronic device shown according to an embodiment of the invention.

A portion of the embodiments of the invention is described in detail hereinafter with reference to figures. In the following, the same reference numerals in different figures should be considered to represent the same or similar elements. The embodiments are only a part of the invention, and do not disclose all possible implementation modes of the invention. Rather, the embodiments are merely examples of methods and systems within the scope of the invention.

FIG. 1 is a schematic diagram of an electronic device shown according to an embodiment of the invention. In different embodiments, an electronic device 100 is, for example, various computer devices, smart devices, server devices, or a combination thereof, but may be not limited thereto. As shown in FIG. 1, the electronic device 100 may include a transceiver 106, a storage device 102, and a processor 104.

The storage device 102 is, for example, any type of fixed or removable random-access memory (RAM), read-only memory (ROM), flash memory, hard disk, or other similar devices or a combination of these devices, and may be used to record a plurality of program codes or software modules.

The transceiver 106 transmits and receives a signal in a wireless or wired manner. The transceiver 130 may also execute an operation such as low noise amplification, impedance matching, frequency mixing, up or down frequency conversion, filtering, amplification, and the like.

The processor 104 is coupled to the storage device 102 and the transceiver 106, and may be a general-purpose processor, special-purpose processor, conventional processor, digital signal processor, a plurality of microprocessors, one or a plurality of microprocessors combined with digital signal processor cores, a controller, microcontroller, application-specific integrated circuit (ASIC), field-programmable gate array (FPGA) circuit, any other type of integrated circuit, state machine, Advanced RISC Machine (ARM)-based processor, and the like.

In an embodiment of the invention, the processor 104 may access the software modules, program codes, or instructions recorded in the storage device 102 to implement the image segmentation model training method provided by the invention, the details of which are described below.

Figure 2:
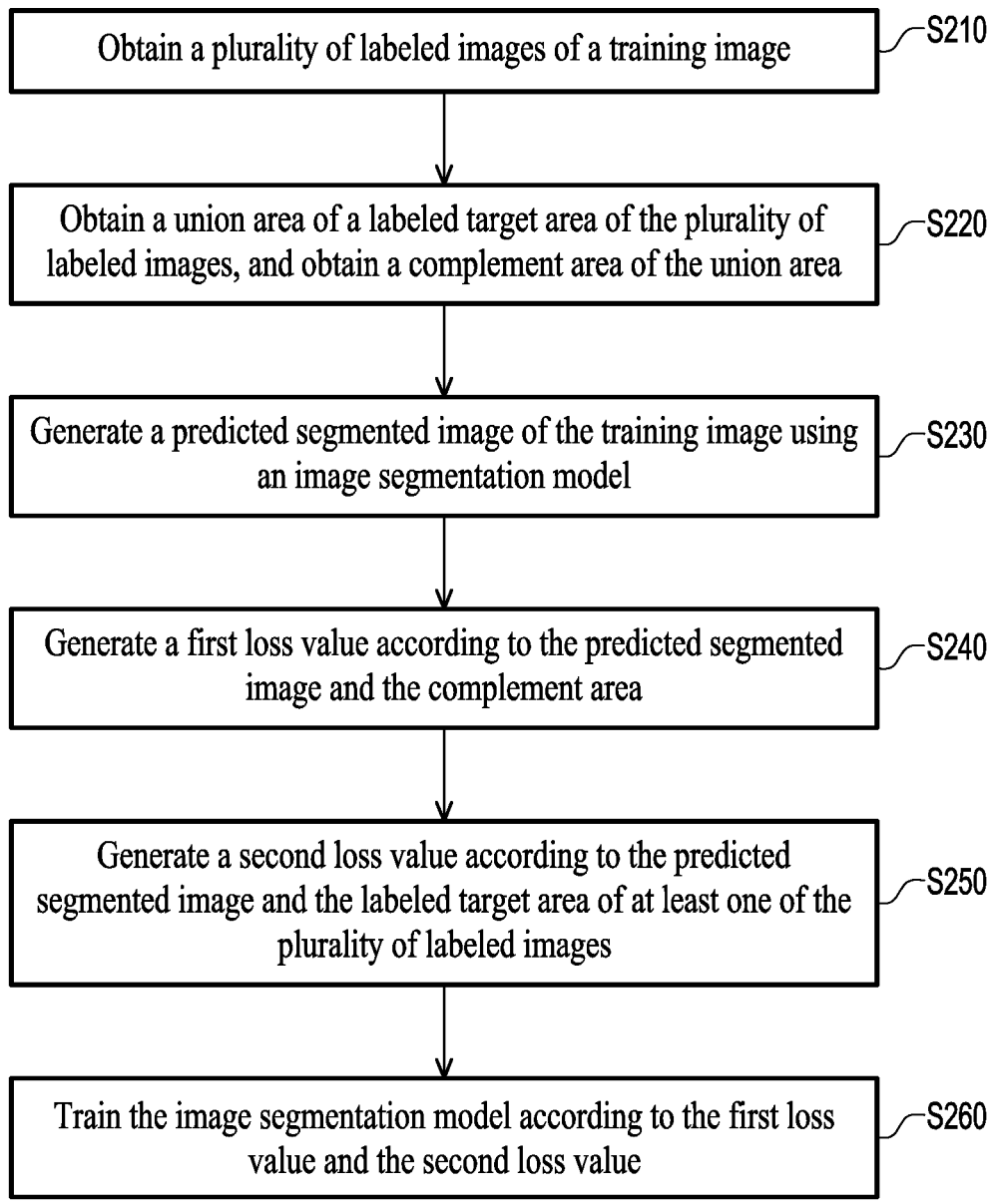
FIG. 2 is a flowchart of an image segmentation model training method shown according to an embodiment of the invention.

FIG. 2 is a flowchart of an image segmentation model training method shown according to an embodiment of the invention. The method of the present embodiment may be performed by the electronic device 100 of FIG. 1, and the details of each step of FIG. 2 are described below with the elements shown in FIG. 1.

First, in step S210, the processor 104 may obtain a plurality of labeled images of a training image. Specifically, the processor 104 needs a plurality of labeled training images to train one image segmentation model. By labeling a target area in each training image, each training image may correspond to a plurality of labeled images, and each labeled image includes a labeled target area and a background area. In general, labeling the training images may be done manually by one or a plurality of labelers. In this way, the processor 104 may train the image segmentation model to have the ability to identify the target areas according to the labeled images. It should be noted that the labeled target areas in the plurality of labeled images of the same training image are not exactly the same.

In some embodiments, the training images may be medical images, such as X-ray images, CT images, or ophthalmoscope images, etc. generated by medical equipment. The image segmentation model may be used for image segmentation of medical images to obtain target areas in the medical images. The target areas in the medical images may be, for example, human organs, various human tissues, diseased tissues, or tumors, and so on. The medical images used to train the model are generally labeled by a plurality of physicians having professional knowledge. However, based on different opinions of different doctors, discrepancies exist for labeled target areas on the same training image labeled by different doctors. That is, the area boundaries of the plurality of labeled target areas respectively corresponding to the labeled images are inconsistent.

Figure 3:
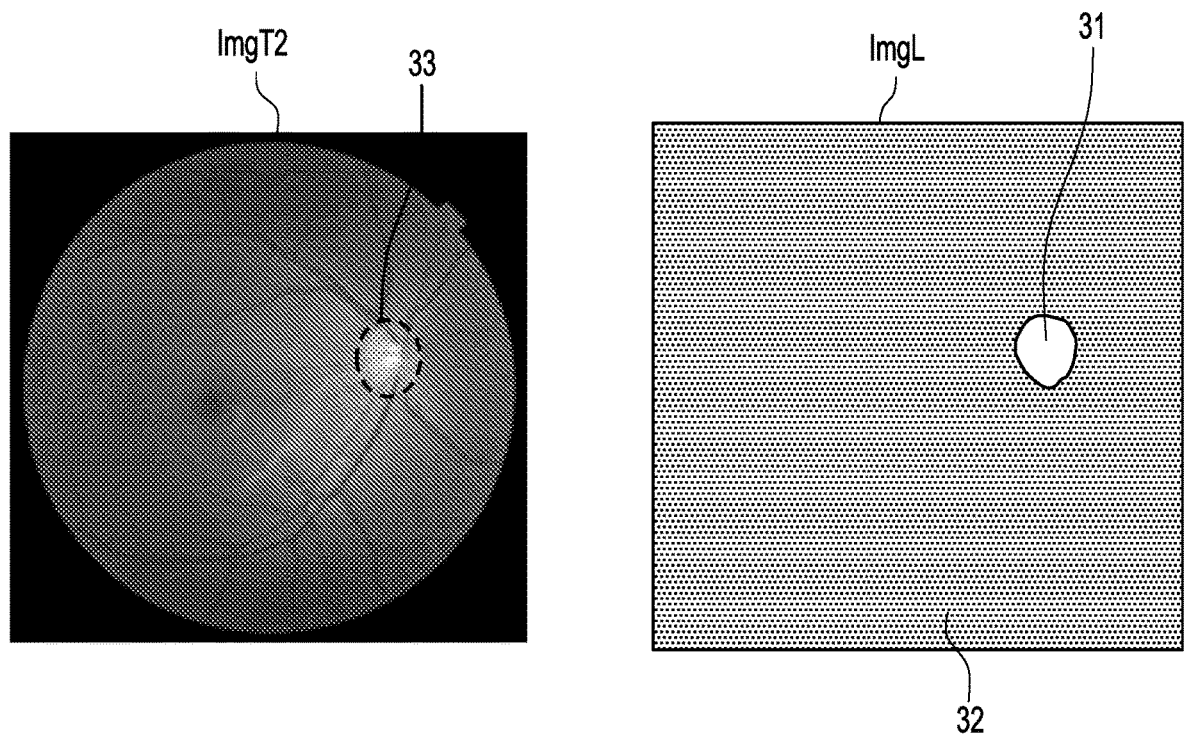
FIG. 3 is a schematic diagram of an ophthalmoscope image and a labeled image shown according to an embodiment of the invention.

For example, the training images may be ophthalmoscope images. FIG. 3 is a schematic diagram of an ophthalmoscope image and a labeled image shown according to an embodiment of the invention. A labeled image ImgL may be generated by labeling an optic disc 33 in an ophthalmoscope image ImgT1 used for model training. The labeled image ImgL includes a labeled target area 31 corresponding to the optic disc 33 and a background area 32. In other words, the labeled target area 31 is the position label of the optic disc 33 in the ophthalmoscope image ImgT1. When different labelers respectively label the optic nerve disc 33 in the ophthalmoscope image ImgT1 to generate a plurality of labeled images, the labeled target areas in the labeled images are not exactly the same.

In some embodiments, each labeled image is a binarized image. Pixels located in the labeled target areas correspond to a value of "1", and pixels located in the background area correspond to a value of "0".

In step S220, the processor 104 may obtain a union area of the labeled target areas of the plurality of labeled images, and obtain a complement area of the union area. Specifically, the processor 104 may obtain a union image including the union area by obtaining union of a plurality of labeled target areas of the labeled images. This union area includes all pixels in the labeled images labeled as the labeled target areas. In some embodiments, the union image is also a binarized image. Pixels located in the union area in the union image correspond to a value of "1", and other pixels located in the union image correspond to a value of "0".

In step S230, the processor 104 may generate a predicted segmented image of the training images using the image segmentation model. During the model training process, the processor 104 may input the training image into the image segmentation model, so that the image segmentation model may output a predicted segmented image after image segmentation. Next, the model parameters of the image segmentation model may be updated and optimized according to the error information of the predicted segmented image. The image segmentation model is used to segment the input image into a plurality of sub-areas. An image segmentation processing is performed on the training images by the image segmentation model, and the predicted segmented image generated by the image segmentation model may include a predicted target area and a predicted background area. In some embodiments, the predicted segmented image is a binarized image. Pixels located in the predicted target area correspond to a value of "1", and pixels located in the predicted background area correspond to a value of "0".

In some embodiments, the image segmentation model is a deep learning model. For example, the image segmentation model may be a semantic segmentation model. The semantic segmentation model may classify each pixel of the input image to obtain the classification result of each pixel in the input image, and determine the predicted target area and the predicted background area in the predicted segmented image according to the classification result of each pixel. The image segmentation model is, for example, U-Net model, Fully Convolutional Networks (FCN) model, SegNet model, Mask R-CNN model, Generative Adversarial Network (GAN) model, or Transformer model, and the like, and the invention is not limited thereto.

In step S240, the processor 104 may generate a first loss value according to the predicted segmented image and the complement area. In some embodiments, the processor 104 may generate the first loss value according to the degree of overlap between the predicted background area of the predicted segmented image and the complement area. In order to make the concept of the operation easier to understand, the following will be supplemented with FIG. 4 for further description.

Figure 4:
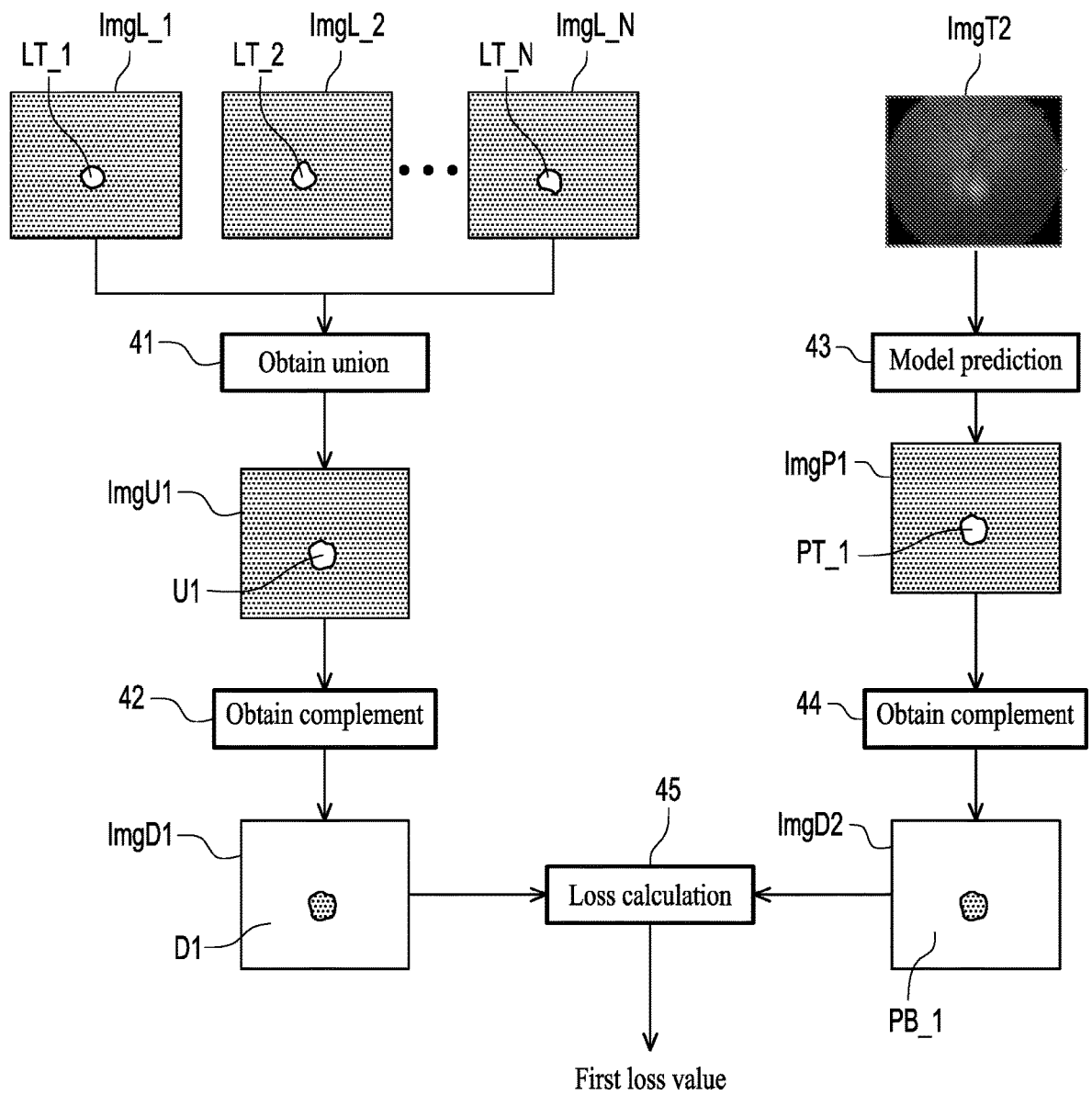
FIG. 4 is a schematic diagram of generating a first loss value shown according to an embodiment of the invention.

FIG. 4 is a schematic diagram of generating a first loss value shown according to an embodiment of the invention. The processor 104 may obtain an N number of labeled images ImgL_1 to ImgL_N of a same training image ImgT2. N may be an integer greater than 1. After image labeling, the labeled images ImgL_1 to ImgL_N respectively have labeled target areas LT_1 to LT_N. The processor 104 may perform a union operation 41 on the labeled target areas LT_1 to LT_N of the labeled images ImgL_1 to ImgL_N to obtain a union image ImgU1 including a union area U1. Next, the processor 104 may perform a complement obtaining operation 42 on the union area U1 to obtain a complement image ImgD1 including a complement area D1.

In some embodiments, all pixels in the union area U1 (labeled with a white background) of the union image ImgU1 correspond to the value "1", and all pixels in the other areas (labeled with a gray background) of the union image ImgU1 correspond to the value "0". Moreover, pixels in the complement area D1 (labeled with a white background) of the complement image ImgD1 correspond to the value "1", and all pixels in the other areas (labeled with a gray background) of the complement image ImgD1 correspond to the value "0".

Moreover, the processor 104 may input the training image ImgT2 into the image segmentation model to perform a model prediction operation 43. The image segmentation model may output a predicted segmented image ImgP1. After image segmentation by the image segmentation model, the predicted segmented image ImgP1 may include a predicted target area PT_1. Next, the processor 104 may perform a complement obtaining operation 44 on the predicted target area PT_1 to obtain a complement image ImgD2 including a predicted background area PB_1. In some embodiments, all the pixels in the predicted target area PT_1 (labeled with a white background) of the predicted segmented image ImgP1 correspond to the value "1", and all the pixels in the predicted background area (labeled with a gray background) of the predicted segmented image ImgP1 correspond to the value "0". Moreover, pixels in the predicted background area PB_1 (labeled with a white background) of the complement image ImgD2 correspond to the value "1", and all pixels in the other areas (labeled with a gray background) of the complement image ImgD2 correspond to the value "0".

Therefore, the processor 104 may perform a loss calculation operation 45 according to the degree of overlap between the predicted background area of the predicted segmented image ImgP1 (i.e., the predicted background area PB_1 of the complement image ImgD2) and the complement area D1 of the complement image ImgD1, so as to generate the first loss value.

Returning to FIG. 2, in step S250, the processor 104 may generate a second loss value according to the predicted segmented image and the labeled target area of at least one of the plurality of labeled images. In some embodiments, the processor 104 may generate the second loss value according to the degree of overlap between the predicted target area in the predicted segmented image and the labeled target area of at least one of the labeled images. In some embodiments, the processor 104 may generate the second loss value according to the degree of overlap between the predicted target area in the predicted segmented image and the complement area of the labeled target areas of the labeled images. In some embodiments, the processor 104 may perform a weighted average on the labeled target areas of the labeled images to obtain a weighted average area, then generate the second loss value according to the degree of overlap between the weighted average area and the predicted target area in the predicted segmented image.

In step S260, the processor 104 may train the image segmentation model according to the first loss value and the second loss value. Specifically, the processor 104 may execute backpropagation on the image segmentation model according to the first loss value and the second loss value, so as to adjust the model parameters of the image segmentation model according to a gradient descent algorithm.

By repeating steps S210 to S260, the processor 104 may gradually optimize the model parameters of the image segmentation model in an iterative manner, so that the image segmentation model may gradually learn better image segmentation results. Therefore, the first loss value and the second loss value are gradually decreased. When the processor 104 determines that the first loss value and the second loss value meet the convergence condition, the processor 104 may determine that the image segmentation model is finished training, and the trained image segmentation model may be used to execute subsequent applications.

Accordingly, in addition to generating a loss value according to the labeled target areas identified by the labeler, in an embodiment of the invention, a loss value may also be generated according to information that all labelers identify as non-target areas (i.e., the complement area of the union area of a plurality of labeled target areas). That is, by training the model on information that all labelers have identified as non-target areas, the image segmentation model trained by an embodiment of the invention may not only learn how to accurately identify target areas, but also learn how to accurately identify non-target areas. Therefore, the accuracy of the image segmentation model may be improved.

Figure 5:
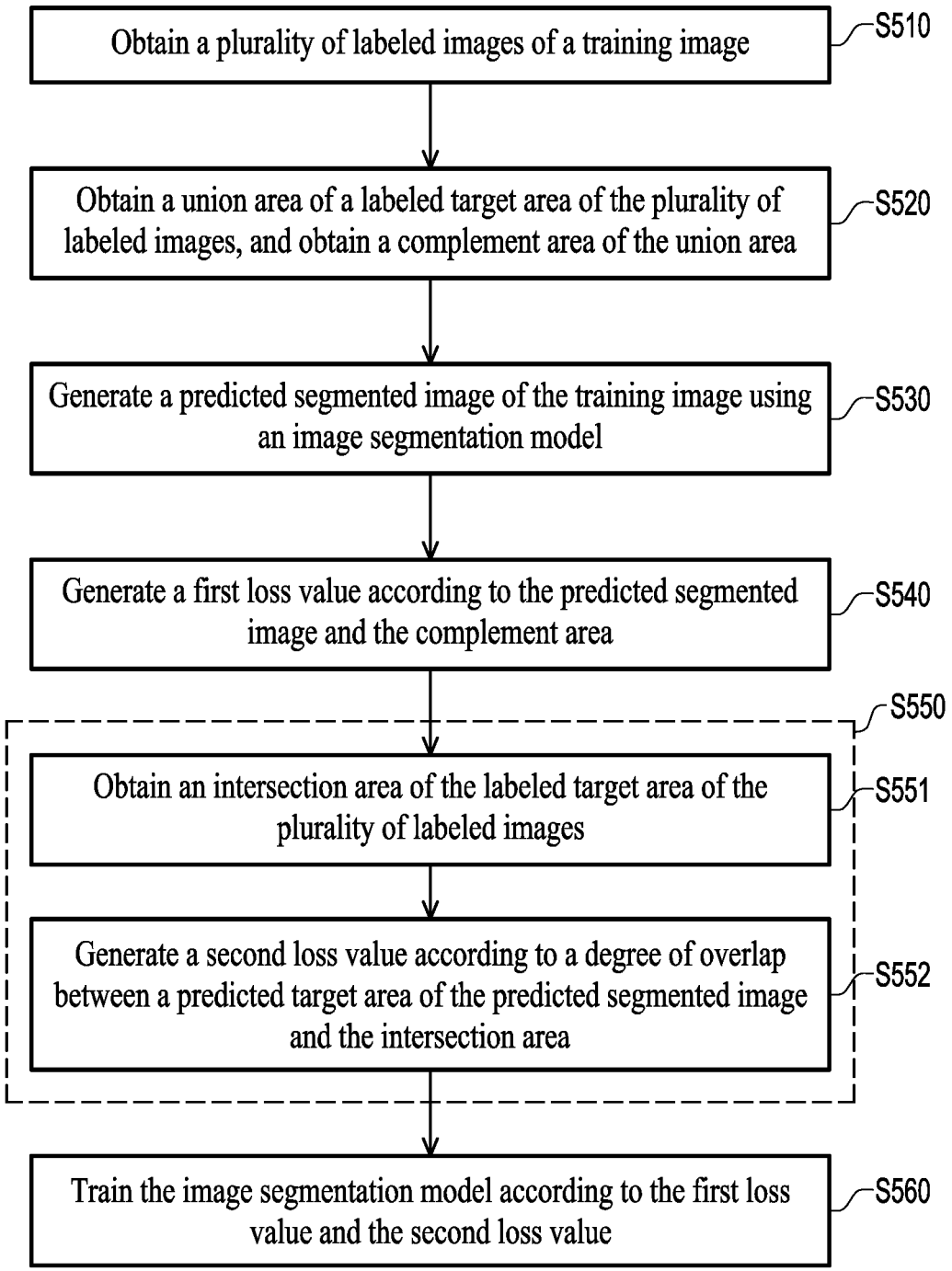
FIG. 5 is a flowchart of an image segmentation model training method shown according to an embodiment of the invention.

FIG. 5 is a flowchart of an image segmentation model training method shown according to an embodiment of the invention. The method of the present embodiment may be performed by the electronic device 100 of FIG. 1, and the details of each step of FIG. 5 are described below with the elements shown in FIG. 1. In order to make the concept of the invention easier to understand, the following will be supplemented with FIG. 6 for further description.

In step S510, the processor 104 may obtain the plurality of labeled images ImgL_1 to ImgL_N of the training image ImgT2. After labeling by the labeler, the labeled images ImgL_1 to ImgL_N may respectively include labeled target areas LT_1 to LT_N and background areas LB_1 to LB_N.

In step S520, the processor 104 may obtain the union area U1 of the labeled target areas LT_1 to LT_N of the plurality of labeled images ImgL_1 to ImgL_N, and obtain the complement area D1 of the union area U1. Specifically, the processor 104 may perform union acquisition on the labeled target areas LT_1 to LT_N of the plurality of labeled images ImgL_1 to ImgL_N to obtain the union image ImgU1 including the union area U1. Next, the processor 104 may perform complement acquisition on the union image ImgU1 including the union area U1 to obtain the complement image ImgD1 including the complement area D1. That is, the processor 104 may respectively obtain the union area U1 and the complement area D1 according to the following Equation (1) and Equation (2).

$$I_U = \bigcup_{i=1}^{N} I_i \quad \text{Equation (1)}$$

$$I_U^C = 1 - \bigcup_{i=1}^{N} I_i \quad \text{Equation (2)}$$

In particular, $I_U$ represents the union image ImgU1; $I_U^C$ represents the complement image ImgD1; $I_i$ represents the labeled images ImgL_1 to ImgL_N.

In step S530, the processor 104 may generate the predicted segmented image ImgP1 of the training image ImgT2 using an image segmentation model M1. In other words, the predicted segmented image ImgP1 is the predicted result of image segmentation performed by the image segmentation model M1 on the training image ImgT2. The predicted segmented image ImgP1 may include the predicted target area PT_1 and a predicted background area PT_2.

In step S540, the processor 104 may generate a first loss value according to the predicted segmented image ImgP1 and the complement area D1. Specifically, the processor 104 may generate a first loss value L1 according to the degree of overlap between the predicted background area PT_2 of the predicted segmented image ImgP1 and the complement area D1. In some embodiments, the processor 104 may generate the first coefficient according to the degree of overlap between the predicted background area PT_2 of the predicted segmented image ImgP1 and the complement area D1. Next, the processor 104 may generate the first loss value L1 according to the difference between the first coefficient and the default value.

Figure 6:
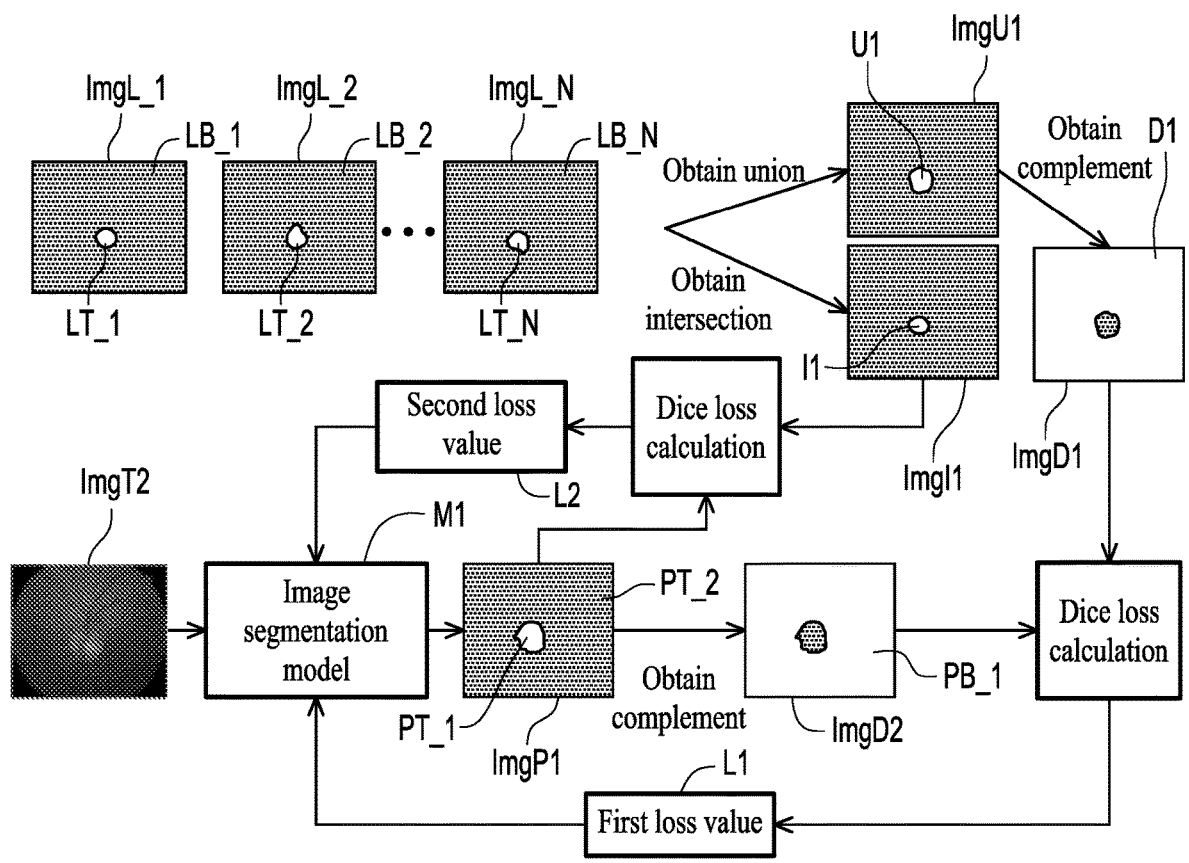
FIG. 6 is a schematic diagram of an image segmentation model training method shown according to an embodiment of the invention.

Referring to FIG. 6, the processor 104 may perform complement acquisition on the predicted segmented image ImgP1 to obtain the complement image ImgD2 including the predicted background area PB_1. Next, the processor 104 may calculate the first loss value L1 according to the complement area D1 in the complement image ImgD1 and the predicted background area PB_1 in the complement image ImgD2. Here, the processor 104 may generate the first coefficient according to the degree of overlap between the predicted background area PB_1 in the complement image ImgD2 and the complement area D1. Next, the processor 104 may generate the first loss value L1 according to the difference between the first coefficient and the default value.

In some embodiments, the first coefficient is a Dice coefficient, and the default value may be 1. That is, the processor 104 may obtain and generate the first coefficient and the first loss value L1 according to the following Equation (3) and Equation (4).

$$\text{Dice}_U = \frac{2|I_U^C \cap (1 - I')|}{|I_U^C| + |1 - I'|} \quad \text{Equation (3)}$$

$$\text{Loss}_U = 1 - \text{Dice}_U \quad \text{Equation (4)}$$

In particular, $\text{Dice}_U$ represents the first coefficient; $I_U^C$ represents the complement image ImgD1; I' represents the predicted segmented image ImgP1; $\text{Loss}_U$ represents the first loss value L1. The value of the first coefficient, which is the Dice coefficient, is between 0 and 1. The higher the first coefficient is, the smaller the first loss value L1 is.

Next, in step S550, the processor 104 may generate a second loss value according to the predicted segmented image and the labeled target area of at least one of the plurality of labeled images. Here, step S550 may be implemented as step S551 to step S552.

In step S551, the processor 104 may obtain an intersection area I1 of the labeled target areas LT_1 to LT_N of the plurality of ImgL_1 to ImgL_N. Specifically, the processor 104 may perform intersection acquisition on the labeled target areas LT_1 to LT_N of the plurality of labeled images ImgL_1 to ImgL_N to obtain an intersection image ImgI1 including the intersection area I1. That is, the processor 104 may obtain the intersection area I1 according to the following Equation (5).

$$I_\cap = \bigcap_{i=1}^{N} I_i \quad \text{Equation (5)}$$

In particular, $I_\cap$ represents the intersection image ImgI1; $I_i$ represents the labeled images ImgL_1 to ImgL_N.

In step S552, the processor 104 generates a second loss value L2 according to the predicted segmented image ImgP1 and the intersection area I1. Specifically, the processor 104 may generate the second loss value L2 according to the degree of overlap between the predicted target area PT_1 of the predicted segmented image ImgP1 and the intersection area I1. In some embodiments, the processor 104 may generate the second coefficient according to the degree of overlap between the predicted background area PT_1 of the predicted segmented image ImgP1 and the intersection area I1. Next, the processor 104 may generate the second loss value L2 according to the difference between the second coefficient and the default value.

In some embodiments, the second coefficient is a Dice coefficient, and the default value may be 1. That is, the processor 104 may obtain and generate the second coefficient and the second loss value L2 according to the following Equation (6) and Equation (7).

$$\text{Dice}_\cap = \frac{2|I_\cap \cap I'|}{|I_\cap| + |I'|} \quad \text{Equation (6)}$$

$$\text{Loss}_\cap = 1 - \text{Dice}_\cap \quad \text{Equation (7)}$$

In particular, $\text{Dice}_\cap$ represents the second coefficient; $I_\cap$ represents the intersection image ImgI1; I' represents the predicted segmented image ImgP1; $\text{Loss}_\cap$ represents the second loss value L2. The value of the second coefficient, which is the Dice coefficient, is between 0 and 1. The higher the second coefficient is, the smaller the second loss value L2 is.

In step S560, the processor 104 may train the image segmentation model M1 according to the first loss value L1 and the second loss value L2. In some embodiments, the processor 104 may perform summing processing on the first loss value L1 and the second loss value L2 to obtain the target loss value. Next, the processor 104 may train the image segmentation model M1 according to the target loss value. That is, the processor 104 may obtain the target loss value according to the following Equation (8), so as to update the model parameters of the image segmentation model M1 according to the target loss value.

$$\text{Loss} = \text{Loss}_\cap + \text{Loss}_\cup = (1 - \text{Dice}_\cap) + (1 - \text{Dice}_\cup) \quad \text{Equation (8)}$$

Or, in other embodiments, the processor 104 may perform weighted sum processing on the first loss value L1 and the second loss value L2 to obtain the target loss value. That is, the processor 104 may respectively multiply the first loss value L1 and the second loss value L2 by corresponding weight values and then add them together to generate the target loss value.

Next, the processor 104 may perform backpropagation on the image segmentation model according to the target loss value to calculate gradient information, so as to adjust the model parameters of the image segmentation model according to a gradient descent algorithm. When the processor 104 determines that the target loss value meets the convergence condition, the processor 104 may determine that the image segmentation model is finished training, and the trained image segmentation model may be used to execute subsequent applications.

Based on the above, in an embodiment of the invention, the complement area of the union area of the labeled target areas of the labeled images may be used to generate the first loss value, and the intersection area of the labeled target areas of the labeled images may be used to generate the second loss value. In other words, according to the generation method of the loss value in an embodiment of the invention, in an embodiment of the invention, the learning objective of the model may be formulated as accurately identifying target areas agreed by all labelers and accurately identifying non-target areas agreed by all labelers. In this way, an uncertain labeled area does not affect the calculation of the loss value, so does not have a negative impact on the training of the image segmentation model. Therefore, compared with the existing labeled image integration method, for the issue of image segmentation uncertainty, an embodiment of the invention may effectively improve the accuracy of the image segmentation model.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An image segmentation model training method performed by an electronic device and comprising:
    obtaining a plurality of labeled images of a training image, wherein each of the plurality of labeled images comprises a labeled target area and a background area;
    obtaining a union area of the labeled target areas of the plurality of labeled images, and obtaining a complement area of the union area;
    generating a predicted segmented image of the training image utilizing an image segmentation model;
    generating a first loss value according to the predicted segmented image and the complement area;
    generating a second loss value according to the predicted segmented image and the labeled target area of at least one of the plurality of labeled images; and
    training the image segmentation model according to the first loss value and the second loss value.

2. The image segmentation model training method of claim 1, wherein the predicted segmented image comprises a predicted target area and a predicted background area, and the step of generating the first loss value according to the predicted segmented image and the complement area comprises:
    generating the first loss value according to a degree of overlap between the predicted background area of the predicted segmented image and the complement area.

3. The image segmentation model training method of claim 2, wherein the step of generating the first loss value according to the degree of overlap of the predicted background area of the predicted segmented image and the complement area comprises:
    generating a first coefficient according to the degree of overlap between the predicted background area of the predicted segmented image and the complement area; and
    generating the first loss value according to a difference between the first coefficient and a default value.

4. The image segmentation model training method of claim 3, wherein the first coefficient is a Dice coefficient.

5. The image segmentation model training method of claim 1, wherein the step of generating the second loss value according to the predicted segmented image and the labeled target area of at least one of the plurality of labeled images comprises:
    obtaining an intersection area of the labeled target areas of the plurality of labeled images; and
    generating the second loss value according to the predicted segmented image and the intersection area.

6. The image segmentation model training method of claim 5, wherein the predicted segmented image comprises a predicted target area and a predicted background area, and the step of generating the second loss value according to the predicted segmented image and the intersection area comprises:
    generating the second loss value according to a degree of overlap between the predicted target area of the predicted segmented image and the intersection area.

7. The image segmentation model training method of claim 6, wherein the step of generating the second loss value according to the degree of overlap of the predicted target area of the predicted segmented image and the intersection area comprises:
generating a second coefficient according to a degree of overlap between the predicted background area of the predicted segmented image and the intersection area; and
generating the second loss value according to a difference between the second coefficient and a default value.

8. The image segmentation model training method of claim 7, wherein the second coefficient is a Dice coefficient.

9. The image segmentation model training method of claim 5, wherein the step of training the image segmentation model according to the first loss value and the second loss value comprises:
performing a summing process on the first loss value and the second loss value to obtain a target loss value; and
training the image segmentation model according to the target loss value.

10. The image segmentation model training method of claim 1, wherein the training image is a medical image, and the image segmentation model is a deep learning model.

11. An electronic device comprising:
a storage device storing a program code; and
a processor coupled to the storage device and accessing the program code to execute:
obtaining a plurality of labeled images of a training image, wherein each of the plurality of labeled images comprises a labeled target area and a background area;
obtaining a union area of the labeled target areas of the plurality of labeled images, and obtaining a complement area of the union area;
generating a predicted segmented image of the training image utilizing an image segmentation model;
generating a first loss value according to the predicted segmented image and the complement area;
generating a second loss value according to the predicted segmented image and the labeled target area of at least one of the plurality of labeled images; and
training the image segmentation model according to the first loss value.

12. The electronic device of claim 11, wherein the predicted segmented image comprises a predicted target area and a predicted background area, and the processor executes:
generating the first loss value according to a degree of overlap between the predicted background area of the predicted segmented image and the complement area.

13. The electronic device of claim 12, wherein the processor executes:
generating a first coefficient according to the degree of overlap between the predicted background area of the predicted segmented image and the complement area; and
generating the first loss value according to a difference between the first coefficient and a default value.

14. The electronic device of claim 13, wherein the first coefficient is a Dice coefficient.

15. The electronic device of claim 11, wherein the processor executes:
obtaining an intersection area of the labeled target areas of the plurality of labeled images;
generating the second loss value according to the predicted segmented image and the intersection area.

16. The electronic device of claim 15, wherein the predicted segmented image comprises a predicted target area and a predicted background area, and the processor executes:
generating the second loss value according to a degree of overlap between the predicted target area of the predicted segmented image and the intersection area.

17. The electronic device of claim 16, wherein the processor executes:
generating a second coefficient according to a degree of overlap between the predicted background area of the predicted segmented image and the intersection area; and
generating the second loss value according to a difference between the second coefficient and a default value.

18. The electronic device of claim 17, wherein the second coefficient is a Dice coefficient.

19. The electronic device of claim 15, wherein the processor executes:
performing a summing process on the first loss value and the second loss value to obtain a target loss value; and
training the image segmentation model according to the target loss value.

20. The electronic device of claim 11, wherein the training image is a medical image, and the image segmentation model is a deep learning model.

* * * * *